United States Patent
Inbaraj et al.

(10) Patent No.: US 10,664,299 B2
(45) Date of Patent: May 26, 2020

(54) POWER OPTIMIZER FOR VDI SYSTEM

(71) Applicant: AMZETTA TECHNOLOGIES, LLC, Norcross, GA (US)

(72) Inventors: Joseprabu Inbaraj, Suwanee, GA (US); Muthukkumaran Ramalingam, Duluth, GA (US); Venkatesaperumal Kondalsamy, Chennai (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 186 days.

(21) Appl. No.: 15/604,097

(22) Filed: May 24, 2017

(65) Prior Publication Data

US 2018/0341507 A1 Nov. 29, 2018

(51) Int. Cl.
*G06F 9/455* (2018.01)
*G06F 9/50* (2006.01)
*G06F 9/451* (2018.01)

(52) U.S. Cl.
CPC .......... *G06F 9/45558* (2013.01); *G06F 9/452* (2018.02); *G06F 9/5077* (2013.01); *G06F 9/5088* (2013.01); *G06F 2009/4557* (2013.01)

(58) Field of Classification Search
CPC ...................... G06F 9/45558; G06F 2009/4557
See application file for complete search history.

(56) References Cited

U.S. PATENT DOCUMENTS

| | | | | |
|---|---|---|---|---|
| 2005/0251802 A1* | 11/2005 | Bozek | ................... | G06F 9/5077 718/1 |
| 2011/0231680 A1* | 9/2011 | Padmanabhan | ....... | G06F 1/3209 713/310 |
| 2012/0030349 A1* | 2/2012 | Sugai | .................... | G06F 9/5077 709/224 |
| 2012/0185709 A1* | 7/2012 | Weissmann | ........... | G06F 1/3234 713/320 |
| 2014/0196027 A1* | 7/2014 | Osogami | ............. | G06F 9/45558 718/1 |

(Continued)

OTHER PUBLICATIONS

Mishra, Mayank. "Dynamic Resource Management Using Virtual Machine Migrations." Sep. 2012. IEEE Communications Magazine. 0163-6804/12. pp. 34-40. (Year: 2012).*

*Primary Examiner* — Meng Ai T An
*Assistant Examiner* — Michael W Ayers
(74) *Attorney, Agent, or Firm* — Locke Lord LLP; Tim Tinkang Xia, Esq.

(57) ABSTRACT

In an aspect of the disclosure, a method, a computer-readable medium, and an apparatus are provided. The apparatus makes a first determination whether a load metric of a first hypervisor is in a first predetermined relationship with a first threshold. The first hypervisor is one of a plurality of hypervisors of a VDI system. The apparatus also makes a second determination whether an available capacity of a second hypervisor is able to run virtual desktops of the first hypervisor when the load metric of the first hypervisor is determined to be in the predetermined relationship with the first threshold. The first hypervisor migrates virtual desktops of the first hypervisor to the second hypervisor when the available capacity of the second hypervisor of the plurality of hypervisors is determined to be able to run virtual desktops of the first hypervisor. The apparatus also powers off the first hypervisor.

12 Claims, 5 Drawing Sheets

(56) References Cited

U.S. PATENT DOCUMENTS

2014/0297842 A1* 10/2014 Yoshimoto ............ G06F 3/0625
709/224
2017/0315838 A1* 11/2017 Nidugala .............. G06F 9/5088

* cited by examiner

POWER OPTIMIZER FOR VDI SYSTEM

BACKGROUND

Field

The present disclosure relates generally to computer systems, and more particularly, to techniques of managing virtual desktops of a virtual desktop infrastructure (VDI) system.

Background

The statements in this section merely provide background information related to the present disclosure and may not constitute prior art.

Computer virtualization is a technique that involves abstracting a physical computing machine platform into a virtual machine (VM) that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. A VDI system can have a number of physical servers with many VMs running on the physical servers. In certain configurations, the load of a physical server is determined by the number of virtual desktops running on that server. But the virtual desktops on the server may not be actively used at all time. Therefore, there is a need for a mechanism that can more efficiently manage utilization of the physical servers of the VDI system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus makes a first determination whether a load metric of a first hypervisor is in a first predetermined relationship with a first threshold. The first hypervisor is one of a plurality of hypervisors of a VDI system. The apparatus also makes a second determination whether an available capacity of a second hypervisor of the plurality of hypervisors is able to run virtual desktops of the first hypervisor when the load metric of the first hypervisor is determined to be in the predetermined relationship with the first threshold. The apparatus requests the first hypervisor to migrate virtual desktops of the first hypervisor to the second hypervisor when the available capacity of the second hypervisor of the plurality of hypervisors is determined to be able to run virtual desktops of the first hypervisor. The apparatus also powers off the first hypervisor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
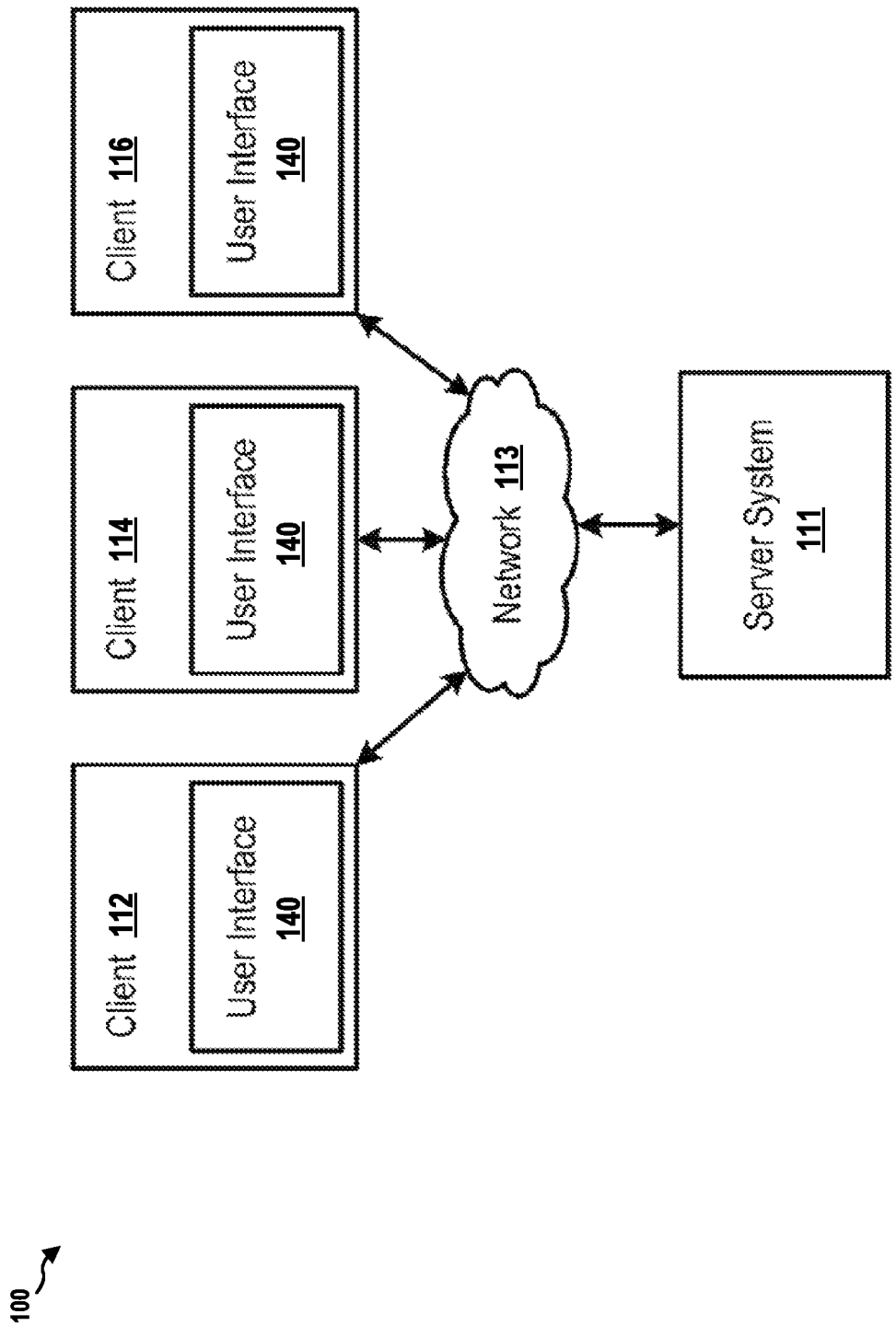
FIG. 1 illustrates a VDI system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a virtual desktop infrastructure (VDI) system 100. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "handheld," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

The VDI system 100 includes a VDI server system 111 in data communication over a network 113 with several VDI client systems 112, 114, and 116. The network 113 may be any configuration, such as a local area network (LAN), or private or publicly accessible wide area network (WAN), such as the Internet. It should be recognized that FIG. 1 shows a simplified representation of a typical VDI server system 111, which may include other components such as firewalls, connection brokers, and load balancers, as well as back-end storage networks, database servers, among others, as described in greater detail in FIG. 2. Each client system 112, 114, 116 may include a user interface 140 through which a user can interact with his or her desktop.

Figure 2:
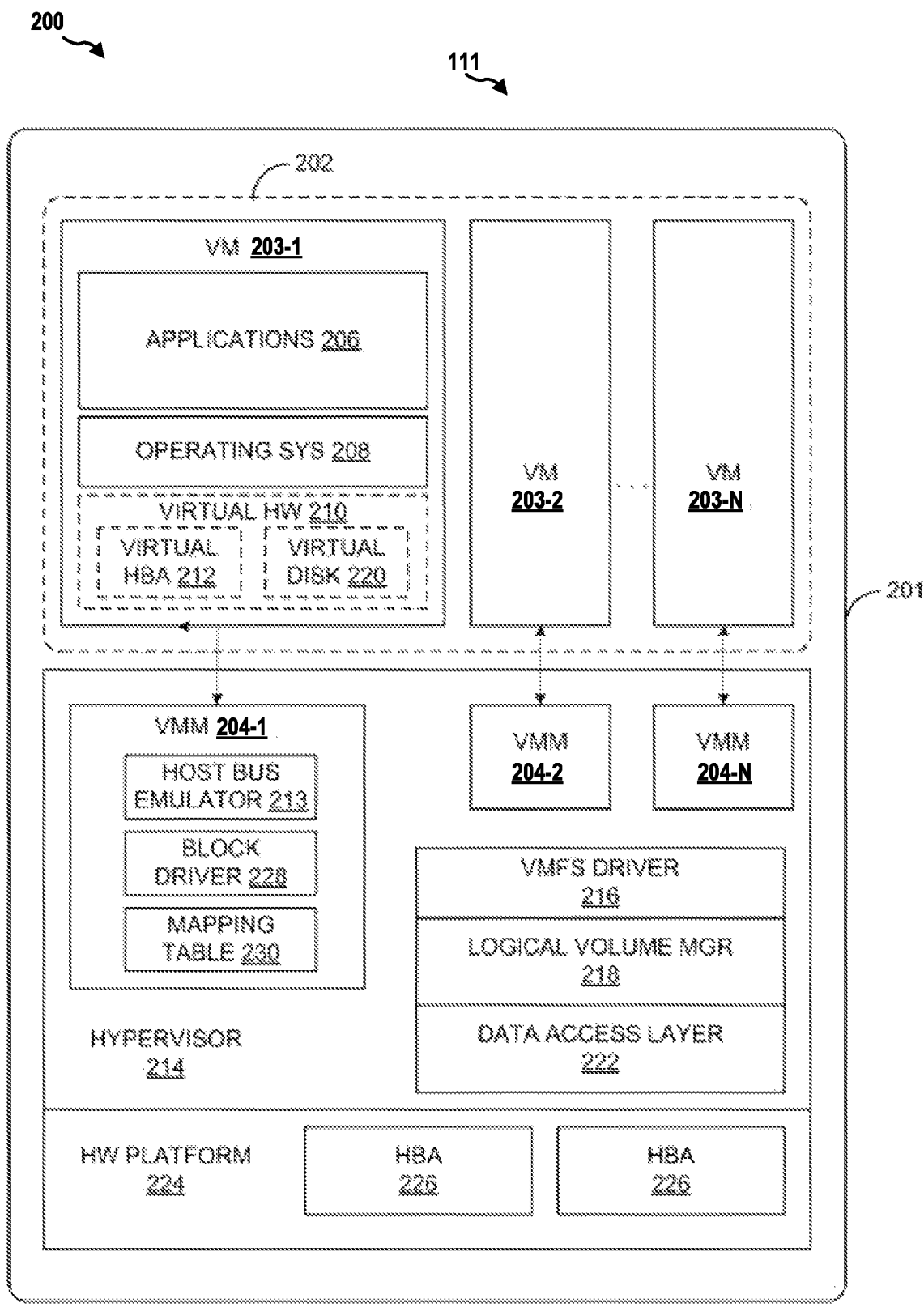
FIG. 2 is diagram illustrating a VM-based system.

FIG. 2 is diagram 200 illustrating the server system 111. The server system 111 includes an integral computer system 201 constructed on a hardware platform 224, including host bus adapters (HBAs) 226 in addition to a processor, memory, and other standard peripheral components (not separately shown). The hardware platform 224 executes a hypervisor 214 supporting a virtual machine execution space 202 within which virtual machines (VMs) 203-1 to 203-N are executed.

The hypervisor 214 provides services and support to enable concurrent execution of VMs 203-1 to 203-N. In turn, each of the VMs 203-1 to 203-N implements a virtual hardware platform 210 as a conceptual layer that supports the execution of a guest operating system 208 and one or more client applications 206 (which may be encapsulated in "application containers," as further discussed below). In certain configurations, the guest operating systems 208 are instances of MICROSOFT® WINDOWS®, LINUX®, etc. Other guest operating systems can be equivalently used. In each instance, a guest operating system 208 includes a native file system layer, typically either an NTFS (New Technology File System) or a ext3 (third extended) file system file system layer. These file system layer interface with the virtual hardware platforms 210 to access, from the perspective of guest operating systems 208, a data storage host bus adapter. In one implementation, virtual hardware platform 210 implements a virtual host bus adapter 212 and a virtual-disk 220 that emulate the necessary system hardware support to enable execution of the guest operating system 208 transparently to the virtualization of the system hardware.

File system calls initiated by guest operating system 208 to perform file system-related data transfer and control operations on virtual-disk 220 are processed and passed through the virtual host bus adapter 212 to adjunct a virtual machine monitor (VMM) 204-1 that implements the virtual system support necessary to coordinate operation with the hypervisor 214. In particular, a host bus emulator 213 functionally in the VMM 204-1 enables the data transfer and control operations to be ultimately passed to the host bus adapters 226. Further, the VMM 204-1 may also include a block driver 228 and accesses a mapping table 230 to assist VMM 204-1 in determining a storage location of data requested by the file system calls from guest operating system 208. For example, upon receiving a file system block level request to read data, the host bus emulator 213 may request the block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual-disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.) stored in data storage systems networked with the server system 111 that may be accessed by any of the VMs 203-1 to 203-N.

For example, a guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual-disk 220, etc.). These virtual disks 220 are maintained as files stored on a VMFS, for example, in a storage system networked to the server system 111. Each such virtual-disk 220 may be maintained as a file or set of files stored on a VMFS, for example, in the networked storage system. Guest operating system 208 file system calls are translated from instructions applicable to virtual-disk 220, which is visible to the guest operating system 208, to instructions applicable to a file representing virtual-disk 220 in the networked storage system exposed by a storage system manager to the VMFS.

Such translations are performed through a number of component layers of an IO (input/output) stack, beginning at the guest operating system 208 (which receives the file system calls from applications 206), through the virtual HBA 212, the host bus emulator 213, the block driver 228, the VMFS driver 216, a logical volume manager 218, which assists the VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 2 may be referred to differently without departing from their functionality or the spirit or scope of embodiments described herein. For example, while the block driver 228 and the mapping table 230 have been depicted as part of the VMM 204-1, it should be recognized that alternative configurations may implement the block driver 228 as part of a different component of hypervisor 214. Furthermore, while one configuration may implement a mapping table 230 for each corresponding virtual-disk 220, alternative configurations may utilize a global mapping table that includes mappings for all virtual disks. Similarly, it should be recognized that while the VMs 203-1 to 203-N may be considered separate virtualization components between the VMs 203-1 to 203-N and the hypervisor 214 (which, in such a configuration, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative configuration, for example, the conceptual layer described as virtual hardware platform 210 may be merged with and into the VMMs 204-1 to 204-N such that the virtual host bus adapter 212 may be removed from FIG. 2, as its functionality is effectuated by the host bus adapter emulator 213.

At the hypervisor level, the block driver 228 monitors for block read requests that fall into the mapping table 230. If a block read request falls into one of the mappings in the mapping table 230, the hypervisor 214 redirects the block read request to an external data storage/source that stores the requested data and then passes the data back to the file system implementation requesting the data.

In certain configurations, applications 206 that are to be delivered via the virtual desktop are encapsulated in application containers. An application container is a data structure that captures an application in an OS-neutral format. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein.

In certain configurations, the applications 206 are do not utilize application containers and are actually installed and copied to the file system of the guest OS of the virtual desktop run in the VM 203-1.

The respective virtual desktop run in each of the VMs 203-1 to 203-N includes an OS (operating system), which can be stored in an "OS store," and one or more applications, which can be stored in an "application store," for example, to be accessed by virtual desktops in the form of application containers.

In one configuration, the OS store and/or the application store are locations in networked storage accessible by the server system 111 that respectively store a number of OS images or application containers that can be selected by an administrator or other user when generating a virtual desktop (e.g., sometimes also referred to as a blob (binary large object) store).

In one example, the virtual desktop of the VM 203-1 may include metadata for use by the file system of virtual desktop (e.g., file descriptors of application containers accessible by the file system of the guest OS, etc.) that, for example, provide data block addresses of virtual-disk 220 that purportedly store the application data.

Further, the VMM 204-1 may include a mapping table 230 for the virtual desktop for use by the hypervisor 214 that maps the data block addresses that purportedly contain the application data in virtual-disk 220 to the actual location of data blocks of the application data of a networked storage system.

Figure 3:
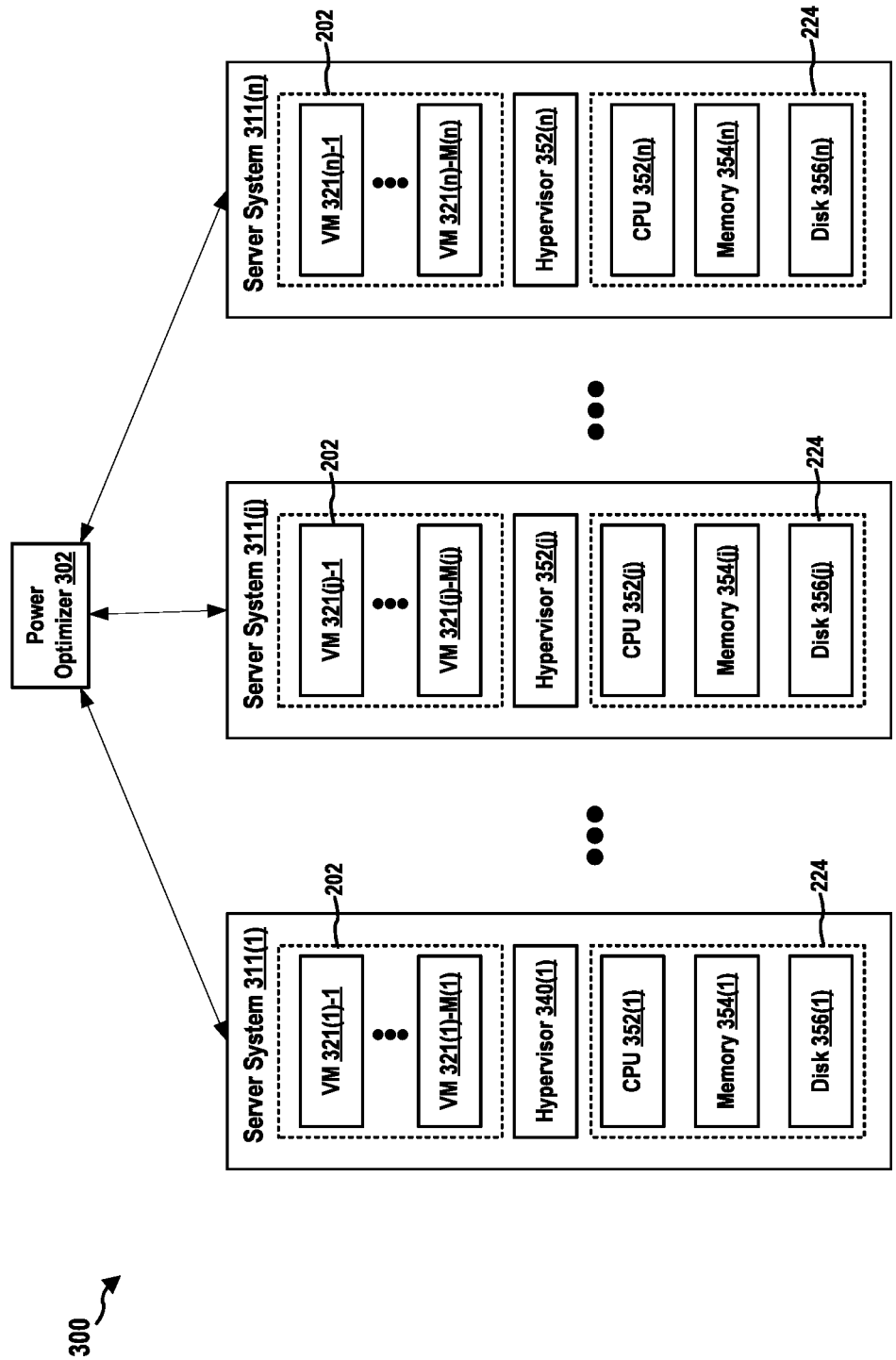
FIG. 3 is diagram illustrating server systems of the VDI system.

FIG. 3 is diagram 300 illustrating server systems 311(1) to 311(n) of a VDI system, n being an integer greater than 1. Each of the server systems 311(1) to 311(n) may be a system that is identical or similar to the server system 111. Using the server system 311(1) as an example, the server system 311(1) includes a hardware platform 224 having a CPU 352(1), a memory 354(1), and a disk 356(1). A hypervisor 340(1) is running on the hardware platform 224 of the server system 311(1). Further, the hypervisor 340(1) provides a virtual machine execution space 202 that is currently executing VMs 321(1)-1 to 321(1)-M(1), M(1) being an integer greater than 0. Further, as shown, the server system 311(j) and the server system 311(n) each have hardware components and software components that are similar to those of the server system 311(1).

Further, a power optimizer 302 monitors performance and operation of each of the server systems 311(1) to 311(n). In particular, the power optimizer 302 may determine one or more load metrics of each of the server systems 311(1) to 311(n). Using the server system 311(1) as an example, the one or more load metrics may include the load of the CPU 352(1), which indicates the percentage of the computing power of the CPU 352(1) that is being used in a predetermined time period (e.g., from 1 minute ago to present). The one or more load metric may also include a usage rate of the memory 354(1), which indicates the percentage of the capacity of the memory 354(1) that is being used. The one or more load metric may also include an indicator of data read/write activities of the disk 356(1) in a predetermined time period (e.g., from 1 minute ago to present). For example, the indicator may indicate the amount of data read/write in the predetermined time period or the number/count of read/write operations in the predetermined time period. In addition, the number (i.e., M(1)) of VMs in the VMs 321(1)-1 to 321(1)-M(1) that are actively executed in the virtual machine execution space 202 may also be a load metric.

In certain configurations, the power optimizer 302 compares the load metrics of the server systems 311(1) to 311(n) and determines a server system that is the least active or utilized. For example, the power optimizer 302 may determine that a server system having the lowest active VM percentage is the least active or utilized, the active VM percentage being the percentage of active VMs on that server system in relation to the maximum number of VMs that can be supported by that server system. In certain configurations, the power optimizer 302 may alternatively or additionally determine the least active or utilized server system based on the load of the CPU, the usage rate of the memory, and/or the indicator of disk activities.

Once the power optimizer 302 has determined the least active or utilized system of the server systems 311(1) to 311(n), the power optimizer 302 may further determine whether the one or more load metrics of that system are in predetermined relationships with (e.g., below) one or more corresponding thresholds. When the one or more load metrics are in the predetermined relationships with the one or more corresponding thresholds, the power optimizer 302 may, in response, take certain actions (e.g., migrate the virtual desktops on the least active or utilized system to another system and shut down that system).

In this example, the power optimizer 302 may determine that the server system 311(1) is the least active or utilized system and that the load metrics of the server system 311(1) are in predetermined relationships with (e.g., below) the corresponding thresholds. As such, the power optimizer 302 can determine that the load of the server system 311(1) is low, that the virtual desktops running on the VMs 321(1)-1 to 321(1)-M(1) may be migrated to another server, and that the server system 311(1) may be powered off after migration.

The power optimizer 302 may request information regarding the active VM percentage, the load of the CPU 352(1), the usage rate of the memory 354(1), and/or the data read/write rates of the disk 356(1) from the hypervisor 340(1). For example, the power optimizer 302 may send a request message to a communication interface of the hypervisor 340(1). The power optimizer 302 may be configured with an active VM percentage thresholds, a load threshold, a memory usage threshold, and/or an activity thread, etc. When the power optimizer 302 receives the above requested information from the hypervisor 340(1), the power optimizer 302 may determine whether the active VM percentage is below the active VM percentage thresholds (e.g., 25%), whether the load of the CPU 352(1) is below the load threshold (e.g., 25%), whether the usage rate of the memory 354(1) is below the usage threshold (e.g., 25%), and/or whether the disk read/write activities are below the activity thresholds. In one example, when the above load metrics are all below the corresponding thresholds, the power optimizer 302 may decide that that utilization of the server system 311(1) is low, that the virtual desktops on the server system 311(1) should be migrated to other available ones of the server systems 311(1) to 311(n), and that the server system 311(1) should be powered down after the migration is complete.

In another example, although a number of VMs (e.g., 30 VMs out of maximum 100 VMs allowed) are executed on the virtual machine execution space 202 of the server system 311(1), the virtual desktops running on those VMs may not be actively or continuously used by users. Therefore, the utilization of the server system 311(1) is low. Accordingly, despite of the number of active (or live) VMs, the power optimizer 302 may still determine that the load of the server system 311(1) is low based on the CPU load, the memory usage, and/or the disk activities.

After making a determination that the server system 311(1) should be powered down (shut down) due to lack of utilization, the power optimizer 302 may search for one or more systems of the server systems 311(1) to 311(n) that are capable of running the virtual desktops of the server system 311(1). In particular, as described supra, the power optimizer 302 may obtain the load metrics of each of the server systems 311(1) to 311(n). The power optimizer 302 may select a server system having load metrics that are not below one or more low thresholds (e.g., 35%, thus the server itself is not subject to shutting down due to low utilization) and that are not above one or more high thresholds (e.g., 60%, thus the server itself likely still has capacity to receive the virtual desktops of the server system 311(1)).

In this example, the power optimizer 302 determines that the server system 311(j) has the capacity to receive the virtual desktops of the server system 311(1). The power optimizer 302 then instructs the server system 311(1) to migrate the virtual desktops executed by the VMs 321(1)-1 to 321(1)-M(1) to the server system 311(j). The migration may be online or offline. In particular, the server system 311(1) may request the server system 311(j) to allocate M(1) (e.g., 25) number of VMs having the specifications and configurations of the VMs 321(1)-1 to 321(1)-M(1) for executing the virtual desktops migrated from the server system 311(1). Accordingly, as an example, the server system 311(j) may create the M(1) number of VMs on the hypervisor 340(j). Subsequently, the hypervisor 340(1) migrates the virtual desktops executed by the VMs 321(1)-1 to 321(1)-M(1) to the allocated VMs of the hypervisor 340(j). After all the virtual desktops of the hypervisor 340(1) have been successfully migrated to the hypervisor 340(j), the server system 311(1) may be powered down (e.g., under the instruction of power optimizer 302).

In certain configurations, the power optimizer 302 may determine that the load metrics of one or more of the sever systems of the server systems 311(1) to 311(n) are above corresponding thresholds (e.g., 80%) and, thus, that those systems have too much load. In one example, the power optimizer 302 may determine that the load of the server system 311(1) is too high. In particular, the CPU load of the CPU 352(1) may be above 80%, the memory usage of the memory 354(1) may be above 80%, and/or the disk activities of the disk 356(1) is above a predetermined threshold. As an example, the hypervisor 340(1) may be running 90 actively used VMs out of maximum 100 VMs that can be supported by the hypervisor 340(1). The power optimizer 302 may decide to reduce the number of active VMs from 90 to 60 and to migrate the virtual desktops of the 30 VMs to other systems. The power optimizer 302 may attempt to find a server system that can receive some or all of the load from the server system 311(1). If no server systems have sufficient capacity, the power optimizer 302 may determine to power on a server system that is currently off to receive load from the server system 311(1). In a first scenario, the power optimizer 302 determines that the server system 311(j) may have some additional capacity. As described supra, the hypervisor 340(1) may migrate a first number (e.g., 10) of virtual desktops to the hypervisor 340(j). After migration, the power optimizer 302 may still determine that the load of the server system 311(1) is too high. But no other server systems have the capacity to receive virtual desktops from the server system 311(1). In this example, the server system 311(n) is currently powered off. Therefore, the power optimizer 302 may decide to power on the server system 311(n) and initialize corresponding number VMs to receive a second number (e.g., 20) of virtual desktops. After the server system 311(n) is powered on and the VMs are initialized, the power optimizer 302 may instruct the server system 311(1) to migrate the second number of virtual desktops to the server system 311(n). The server system 311(1) then accordingly migrates the second number of virtual desktops to the server system 311(n).

Figure 4:
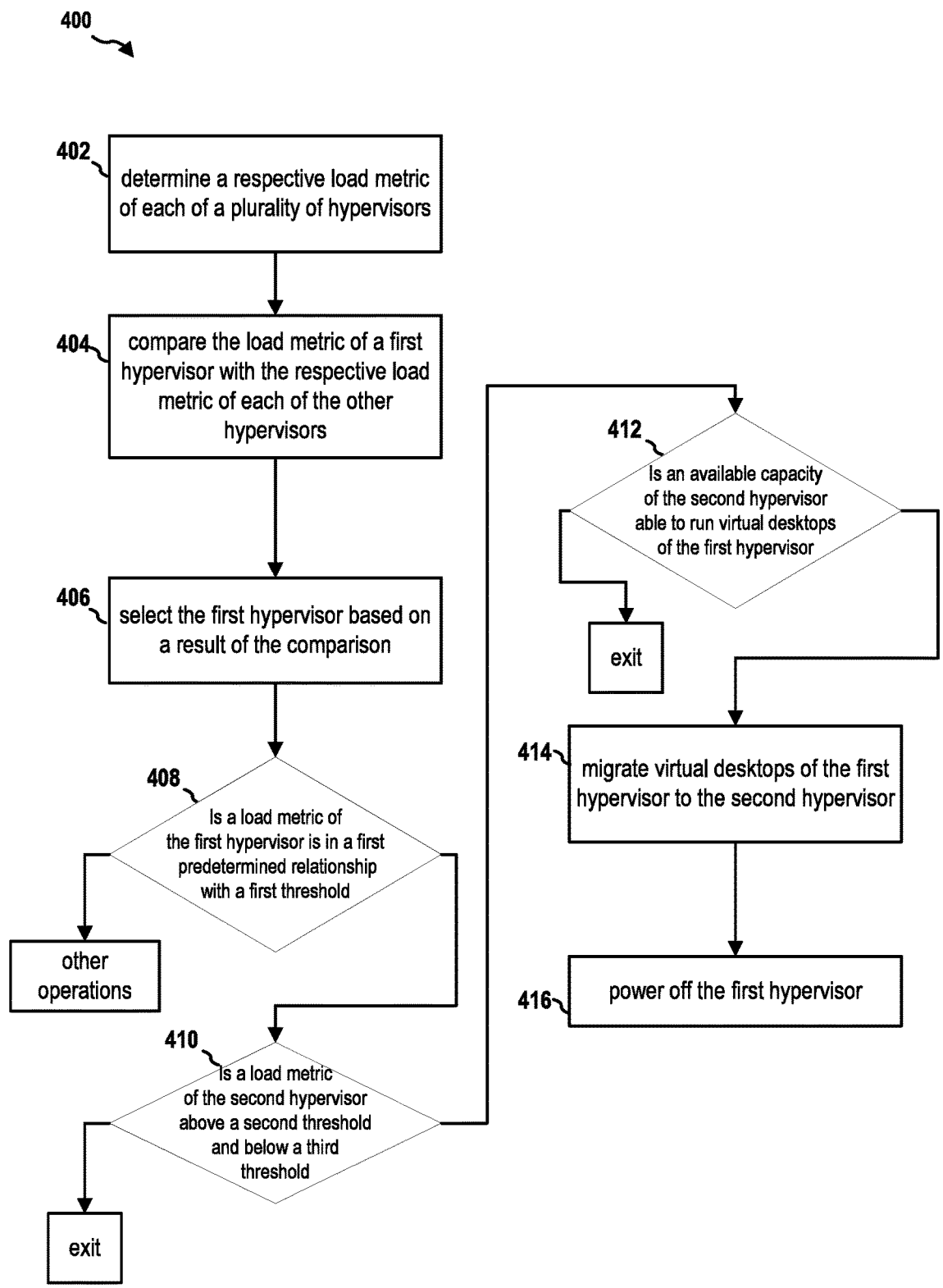
FIG. 4 is a flow chart of a method (process) for backing up a virtual desktop image and validating a backup image.

FIG. 4 is a flow chart 400 of a method (process) for managing virtual desktops of a VDI system. The method may be performed by a VDI management device (e.g., the power optimizer 302 and the apparatus 302/302'). In certain configurations, at operation 402, the VDI management device determines a respective load metric of each of a plurality of hypervisors (e.g., the hypervisor 340(1) to the hypervisor 340(n)) of the VDI system. At operation 404, the VDI management device compares the load metric of a first hypervisor (e.g., the hypervisor 340(1)) with the respective load metric of each of the other hypervisors of the plurality of hypervisors. At operation 406, the VDI management device selects the first hypervisor to make a first determination based on a result of the comparison. The first hypervisor is one of the plurality of hypervisors.

At operation 408, the VDI management device makes a first determination whether a load metric of the first hypervisor is in a first predetermined relationship with a first threshold (e.g., whether the load of the CPU 352(1) is below 20%). In certain configurations, the first threshold is at least one of a number threshold of virtual machines running on the first hypervisor, a load threshold of a processor of the first hypervisor, a usage threshold of a memory of the first hypervisor, and an activity threshold of a disk of the first hypervisor. In certain configurations, the VDI management device determines a load of the processor of the first hypervisor. The first determination includes determining whether the load is below the load threshold. In certain configurations, the VDI management device determines a usage of the memory of the first hypervisor. The first determination includes determining whether the usage is above the usage threshold. In certain configurations, the VDI management device determines a count of read or write activities performed by the disk of the first hypervisor. The first determination includes determining whether the count is above the activity threshold.

In certain configurations, when the load metric is not in the first predetermined relationship with the first threshold, the VDI management device makes a fourth determination whether the load metric of the first hypervisor is in a second predetermined relationship with a fourth threshold (e.g., whether the CPU load of the CPU 352(1) is above 80%). The VDI management device powers on a third hypervisor (e.g., the hypervisor 340(n)) when the load metric of the first hypervisor is in the second predetermined relationship with the fourth threshold and the third hypervisor is not powered on. The VDI management device requests the first hypervisor to migrate one or more of virtual desktops of the first hypervisor to the third hypervisor.

When the load metric of the first hypervisor is determined to be in the predetermined relationship with the first threshold, at operation 410, the VDI management device makes a third determination whether a load metric of a second hypervisor (e.g., the hypervisor 340(j)) is above a second threshold and below a third threshold (e.g., whether the load of the CPU 352(j) is above 35% and below 60%).

When the load metric of the second hypervisor is determined to be above the second threshold and below the third threshold, at operation 412, the VDI management device makes a second determination whether an available capacity of the second hypervisor is able to run virtual desktops of the first hypervisor.

When the available capacity of the second hypervisor is determined to be able to run virtual desktops of the first hypervisor, at operation 414, the VDI management device requests the first hypervisor to migrate virtual desktops of the first hypervisor to the second hypervisor. At operation 416, the VDI management device powers off the first hypervisor.

Figure 5:
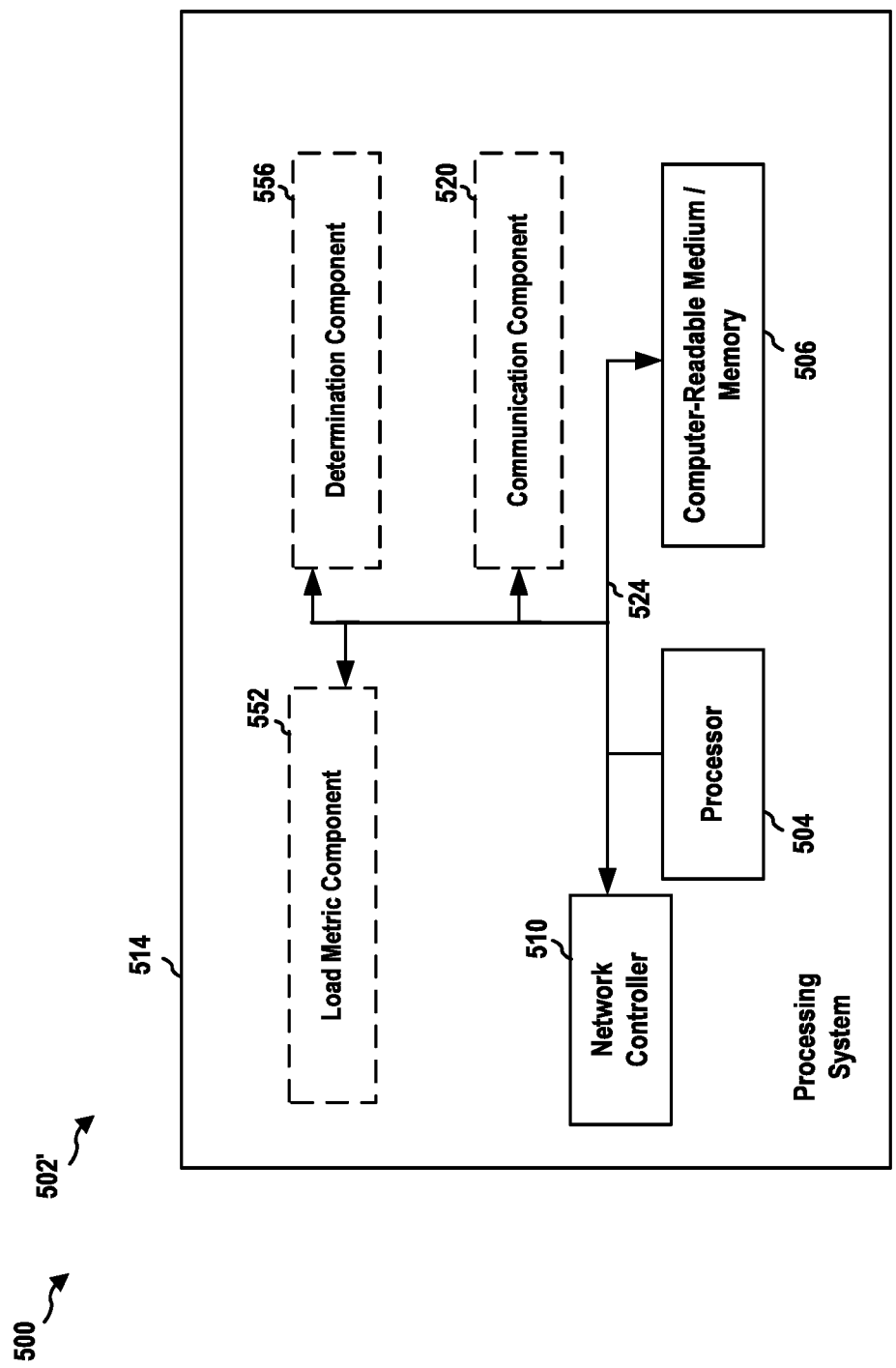
FIG. 5 is a diagram illustrating an example of a hardware implementation for an apparatus employing a processing system.

FIG. 5 is a diagram 500 illustrating an example of a hardware implementation for an apparatus 302' (e.g., the power optimizer 302) employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, including the processor 504 the computer-readable medium/memory 506, and the network controller 510. The bus 524 may also link various other circuits such as timing sources, peripherals, voltage regulators, and power management circuits, which are well known in the art, and therefore, will not be described any further.

The processing system 514 may be coupled to a network controller 510. The network controller 510 provides a means for communicating with various other apparatus over a network. The network controller 510 receives a signal from the network, extracts information from the received signal, and provides the extracted information to the processing system 514, specifically the communication component 520. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the load metric component 552 and the determination component 556. The components may be software components running in the processor 504, resident/stored in the computer readable medium/memory 506, one or more hardware components coupled to the processor 504, or some combination thereof.

Further, a load metric component 552 of the apparatus 302' obtains the load metrics from servers of a VDI system. A determination component 556 makes the determination shown in FIG. 4.

The apparatus 302/302' may be configured to include means for performing each of the operations described supra referring to FIG. 4. The aforementioned means may be one or more of the aforementioned components of the apparatus 302 and/or the processing system 514 of the apparatus 302' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing virtual desktops of a virtual desktop infrastructure (VDI) system having a plurality of VDI server systems, the VDI system comprising at least a first and second hypervisor of a plurality of hypervisors running on at least a first and second server system respectively of the VDI system, the method comprising:
    making a first determination whether a load metric of the first hypervisor is within a first range of load metrics, the first range being above a first threshold and below a second threshold, the load metric of the first hypervisor being due to the load of a plurality of virtual desktops run on the first hypervisor, wherein the first threshold represents a minimum load metric for the first hypervisor, and the second threshold represents a maximum load metric for the first hypervisor;
    requesting the first hypervisor to migrate all of the virtual desktops of the first hypervisor running on the first server system to the second hypervisor running on the second server system when the load metric of the first hypervisor is below the first threshold, and an available capacity of the second hypervisor is determined to be able to run all of the virtual desktops of the first hypervisor, and powering off the first hypervisor on the first server system after all of the virtual desktops of the first hypervisor have been migrated;
    in response to the result of the first determination being that the load metric of the first hypervisor is above the second threshold;
    making a second determination whether an available capacity of a second hypervisor is able to run one or more of the virtual desktops of the first hypervisor by determining whether a load metric of the second hypervisor is within a second range of load metrics, the second range being above a third threshold and below a fourth threshold, wherein the second range of load metrics are within, but not equal to, the first range of load metrics, and wherein the third threshold represents a minimum load metric for the second hypervisor, and the fourth threshold represents a maximum load metric for the second hypervisor; and
    in response to the result of the second determination being that the load metric of the second hypervisor is within the second range of load metrics;
        (i) determining a migrating number, wherein the migrating number of the virtual desktops of the first hypervisor are to be migrated from the first server system to reduce the load metric of the first hypervisor below the second threshold, and the migrating number is smaller than a total number of the virtual desktops of the first hypervisor;
        (ii) determining a first number based on the available capacity of the second hypervisor, wherein the available capacity of the second hypervisor is determined to be able to run the first number of the virtual desktops of the first hypervisor, and the first number is smaller than the total number of the virtual desktops of the first hypervisor, and requesting the first hypervisor to migrate the migrating number of the virtual desktops of the first hypervisor running on the first server system to the second hypervisor running on the second server system when the first number is greater than or equal to the migrating number;
        (iii) determining that the migrating number is greater than the first number; and
        (iv) requesting the first hypervisor to migrate the first number of the virtual desktops of the first hypervisor running on the first server system to the second hypervisor running on the second server system, and after the first number of the virtual desktops of the first hypervisor have been migrated to the second hypervisor, powering on a third server system of the VDI server systems, executing a third hypervisor on the third server system of the VDI server systems, and requesting the first hypervisor to migrate a second number of the virtual desktops of the first hypervisor running on the first server system to the third hypervisor, wherein the second number is the difference between the migrating number and the first number.

2. The method of claim 1, wherein the first threshold is at least one of a number threshold of virtual machines running on the first hypervisor, a load threshold of a processor of the first hypervisor, a usage threshold of a memory of the first hypervisor, and an activity threshold of a disk of the first hypervisor.

3. The method of claim 2, further comprising:
determining a count of read or write activities performed by the disk of the first hypervisor, wherein the first determination includes determining whether the count is above the activity threshold.

4. The method of claim 1, further comprising:
determining a respective load metric of each of the plurality of hypervisors running on the VDI server systems;
comparing the load metric of the first hypervisor with the respective load metric of each of the other hypervisors of the plurality of hypervisors; and
selecting the first hypervisor to make the first determination based on a result of the comparison.

5. An apparatus for managing virtual desktops of a virtual desktop infrastructure (VDI) system having a plurality of VDI server systems, the VDI system comprising at least a first and second hypervisor of a plurality of hypervisors running on at least a first and second server system respectively of the VDI system, the apparatus comprising:
a memory; and
at least one processor coupled to the memory and configured to:
make a first determination whether a load metric of a first hypervisor is within a first range of load metrics, the first range being above a first threshold and below a second threshold, wherein the first hypervisor is a hypervisor running on a first server system of the VDI server systems, and the load metric of the first hypervisor being due to the load of a plurality of virtual desktops run on the first hypervisor, wherein the first threshold represents a minimum load metric for the first hypervisor, and the second threshold represents a maximum load metric for the first hypervisor;
make a second determination whether an available capacity of a second hypervisor is able to run one or more of the virtual desktops of the first hypervisor by determining whether a load metric of the second hypervisor is within a second range of load metrics, the second range being above a third threshold and below a fourth threshold, wherein the second hypervisor is a hypervisor running on a second server system of the VDI server systems, wherein the second range of load metrics are within, but not equal to, the first range of load metrics, and wherein the third threshold represents a minimum load metric for the second hypervisor, and the fourth threshold represents a maximum load metric for the second hypervisor;
request the first hypervisor to migrate all of the virtual desktops of the first hypervisor running on the first server system to the second hypervisor running on the second server system when the load metric of the first hypervisor is below the first threshold, and the available capacity of the second hypervisor is determined to be able to run all of the virtual desktops of the first hypervisor, and after all of the virtual desktops of the first hypervisor have been migrated, power off the first hypervisor on the first server system;
when the load metric of the first hypervisor is above the second threshold and the load metric of the second hypervisor is within the second range of load metrics,
(i) determine a migrating number, wherein the migrating number of the virtual desktops of the first hypervisor are to be migrated from the first server system to reduce the load metric of the first hypervisor below the second threshold, and the migrating number is smaller than a total number of the virtual desktops of the first hypervisor;
(ii) determine a first number based on the available capacity of the second hypervisor, wherein the available capacity of the second hypervisor is determined to be able to run the first number of the virtual desktops of the first hypervisor, and the first number is smaller than the total number of the virtual desktops of the first hypervisor;
(iii) request the first hypervisor to migrate the migrating number of the virtual desktops of the first hypervisor running on the first server system to the second hypervisor running on the second server system when the first number is greater than or equal to the migrating number; and
(iv) request the first hypervisor to migrate the first number of the virtual desktops of the first hypervisor running on the first server system to the second hypervisor running on the second server system when the migrating number is greater than the first number, and after the first number of the virtual desktops of the first hypervisor have been migrated to the second hypervisor, power on a third server system of the VDI server systems, execute a third hypervisor on the third server system of the VDI server systems, and request the first hypervisor to migrate a second number of the virtual desktops of the first hypervisor running on the first server system to the third hypervisor, wherein the second number is the difference between the migrating number and the first number.

6. The apparatus of claim 5, wherein the first threshold is at least one of a number threshold of virtual machines running on the first hypervisor, a load threshold of a processor of the first hypervisor, a usage threshold of a memory of the first hypervisor, and an activity threshold of a disk of the first hypervisor.

7. The apparatus of claim 6, wherein the at least one processor is further configured to:
determine a count of read or write activities performed by the disk of the first hypervisor, wherein the first determination includes determining whether the count is above the activity threshold.

8. The apparatus of claim 5, wherein the at least one processor is further configured to:
determine a respective load metric of each of plurality of hypervisors running on the VDI server systems;

compare the load metric of the first hypervisor with the respective load metric of each of the other hypervisors of the plurality of hypervisors; and select the first hypervisor to make the first determination based on a result of the comparison.

9. A non-transitory computer-readable medium storing computer executable code for operating an apparatus managing virtual desktops of a virtual desktop infrastructure (VDI) system having a plurality of VDI server systems, the VDI system comprising at least a first and second hypervisor of a plurality of hypervisors running on at least a first and second server system respectively of the VDI system, the non-transitory computer-readable medium comprising code to:

make a first determination whether a load metric of a first hypervisor is within a first range of load metrics, the first range being above a first threshold and below a second threshold, wherein the first hypervisor is a hypervisor running on a first server system of the VDI server systems, and the load metric of the first hypervisor being due to the load of a plurality of virtual desktops run on the first hypervisor, wherein the first threshold represents a minimum load metric for the first hypervisor, and the second threshold represents a maximum load metric for the first hypervisor;

make a second determination whether an available capacity of a second hypervisor is able to run one or more of the virtual desktops of the first hypervisor by determining whether a load metric of the second hypervisor is within a second range of load metrics, the second range being above a third threshold and below a fourth threshold, wherein the second hypervisor is a hypervisor running on a second server system of the VDI server systems, wherein the second range of load metrics are within, but not equal to, the first range of load metrics, and wherein the third threshold represents a minimum load metric for the second hypervisor, and the fourth threshold represents a maximum load metric for the second hypervisor;

request the first hypervisor to migrate all of the virtual desktops of the first hypervisor running on the first server system to the second hypervisor running on the second server system when the load metric of the first hypervisor is below the first threshold, and the available capacity of the second hypervisor is determined to be able to run all of the virtual desktops of the first hypervisor, and after all of the virtual desktops of the first hypervisor have been migrated, power off the first hypervisor on the first server system;

when the load metric of the first hypervisor is above the second threshold and the load metric of the second hypervisor is within the second range of load metrics, (i) determine a migrating number, wherein the migrating number of the virtual desktops of the first hypervisor are to be migrated from the first server system to reduce the load metric of the first hypervisor below the second threshold, and the migrating number is smaller than a total number of the virtual desktops of the first hypervisor;

(ii) determine a first number based on the available capacity of the second hypervisor, wherein the available capacity of the second hypervisor is determined to be able to run the first number of the virtual desktops of the first hypervisor, and the first number is smaller than the total number of the virtual desktops of the first hypervisor;

(iii) request the first hypervisor to migrate the migrating number of the virtual desktops of the first hypervisor running on the first server system to the second hypervisor running on the second server system when the first number is greater than or equal to the migrating number; and (iv) request the first hypervisor to migrate the first number of the virtual desktops of the first hypervisor running on the first server system to the second hypervisor running on the second server system when the migrating number is greater than the first number, and after the first number of the virtual desktops of the first hypervisor have been migrated to the second hypervisor, power on a third server system of the VDI server systems, execute a third hypervisor on the third server system of the VDI server systems, and request the first hypervisor to migrate a second number of the virtual desktops of the first hypervisor running on the first server system to the third hypervisor, wherein the second number is the difference between the migrating number and the first number.

10. The non-transitory computer-readable medium of claim 9, wherein the first threshold is at least one of a number threshold of virtual machines running on the first hypervisor, a load threshold of a processor of the first hypervisor, a usage threshold of a memory of the first hypervisor, and an activity threshold of a disk of the first hypervisor.

11. The non-transitory computer-readable medium of claim 10, wherein the code is further configured to:

determine a count of read or write activities performed by the disk of the first hypervisor, wherein the first determination includes determining whether the count is above the activity threshold.

12. The non-transitory computer-readable medium of claim 10, wherein the code is further configured to:

determine a respective load metric of each of the plurality of hypervisors running on the VDI server systems;

compare the load metric of the first hypervisor with the respective load metric of each of the other hypervisors of the plurality of hypervisors; and select the first hypervisor to make the first determination based on a result of the comparison.

* * * * *